(12) United States Patent
Tsunoda et al.

(10) Patent No.: US 6,688,644 B2
(45) Date of Patent: Feb. 10, 2004

(54) STEERING APPARATUS

(75) Inventors: Yoshihiro Tsunoda, Ikoma (JP); Noboru Minamoto, Kashihara (JP); Yoshikazu Kuromaru, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/041,242

(22) Filed: Jan. 8, 2002

(65) Prior Publication Data

US 2002/0140219 A1 Oct. 3, 2002

(30) Foreign Application Priority Data

Mar. 29, 2001 (JP) ........................................ 2001-096894

(51) Int. Cl.⁷ ................................................ B62D 1/19
(52) U.S. Cl. ........................... 280/777; 280/775; 74/492
(58) Field of Search ................. 280/777, 775; 74/492

(56) References Cited

U.S. PATENT DOCUMENTS

| | | | | |
|---|---|---|---|---|
| 5,286,056 A | * | 2/1994 | Speich | 280/777 |
| 5,346,255 A | * | 9/1994 | Schafer et al. | 280/775 |
| 5,452,917 A | * | 9/1995 | Fujiu et al. | 280/777 |
| 5,503,431 A | * | 4/1996 | Yamamoto | 280/777 |
| 5,755,461 A | * | 5/1998 | Halacka et al. | 280/777 |
| 5,871,233 A | * | 2/1999 | Tanaka et al. | 280/777 |
| 6,039,350 A | * | 3/2000 | Patzelt et al. | 280/775 |
| 6,324,935 B1 | * | 12/2001 | Schoen et al. | 74/493 |
| 2002/0167157 A1 | * | 11/2002 | Matsumoto et al. | 280/777 |
| 2003/0000330 A1 | * | 1/2003 | Murakami et al. | 74/492 |

FOREIGN PATENT DOCUMENTS

| | | | |
|---|---|---|---|
| JP | 1-249573 | * | 10/1989 |
| JP | 9-2294 | * | 1/1997 |
| JP | 2000-225953 | | 8/2000 |
| JP | 2001-233223 | | 8/2001 |

* cited by examiner

Primary Examiner—Paul N. Dickson
Assistant Examiner—George D. Spisich
(74) Attorney, Agent, or Firm—Darby & Darby (57) ABSTRACT

With the steering apparatus, a tilt can be adjusted by sliding a column bracket, which is fastened to a column housing supporting a steering shaft so as to be rotatable, along tilting apertures provided at side walls of a tilting bracket. A contact projection which is projected toward a stopper from a substantially center portion of the column bracket for limiting a tilt angle crashes into the stopper with a slide of the column bracket caused by a secondary crash and pushes the stopper into guiding apertures arranged in an extension to the tilting apertures. The steering apparatus can realize absorption of energy of a secondary crash by increasing a tilt angle always under a proper condition, while high accuracy is unnecessary in shaping related parts.

9 Claims, 7 Drawing Sheets

STEERING APPARATUS

BACKGROUND OF THE INVENTION

1. Field of the invention

The present invention relates to a steering apparatus adapted to support a steering shaft so that a tilt can be adjusted and, more particularly, to a steering apparatus constituted to absorb energy of a secondary crash which is applied to the steering shaft at the time of a vehicle crash, utilizing a guiding portion for tilt adjustment.

2. Description of Related Art

A vehicle is steered by transmitting rotation caused by an operation of a steering wheel disposed in a driver's room to a steering mechanism disposed outside the driver's room for turning tire wheels for steering (the front wheels, in general). The steering wheel is mounted at an upper end portion of a steering shaft which is supported in the driver's room so as to be rotatable about an axis so that a driver can operate the steering wheel.

The steering shaft is rotatably supported in a cylindrical column housing. The steering shaft and the column housing are supported in a tilted orientation with the upper end portion, at which the steering wheel is mounted, leaning backwards. The steering shaft is extended to the exterior of the driver's room via an intermediate transmittance shaft such as a universal joint or the like, and is connected to the steering mechanism. The steering mechanism has a movement transforming unit, such as a rack-and-pinion, a ball thread or the like, allowing rotation of the steering wheel transmitted via the steering shaft and the intermediate transmittance shaft to the steering mechanism to be transformed into movement for turning the tire wheels via the movement transforming unit.

Some of such steering apparatuses of late years have a constitution with which a position of the steering wheel at an upper end of the steering shaft can be adjusted for realizing driver's comfortable steering operation. In general, a position of the steering wheel is adjusted with a combination of tilt adjustment for adjusting a tilt angle of the steering shaft along with the a column housing and telescopic adjustment for extending and contracting a middle portion of the steering shaft and the column housing.

Moreover, many of steering apparatuses of late years comprise an energy absorbing mechanism for absorbing energy of the crash, for reducing damage to the driver who has made a crash (a secondary crash) into the steering wheel by the action of inertia to the front at the time of the crash of the vehicle. In general, the energy absorbing mechanism is provided with an elastic portion at a middle portion of the steering shaft and the column housing, which portion is elastic in an axial direction under suitable resistance. Energy of the secondary crash is absorbed in virtue of sliding resistance which is generated while the elastic portion is contracted by action force caused by the secondary crash.

However, in a steering apparatus for a vehicle with a small space at the front portion of the driver's seat, such as a buss, a truck, a monospace car or the like, the steering shaft has to be supported with a large tilt angle with regard to a floor. In such a state, a direction of force, which is applied to the steering wheel at an upper end of the steering shaft at the time of the secondary crash, scarcely accords with an axial direction of the steering shaft. With a steering apparatus of this kind, the above energy absorption utilizing contraction of the steering shaft and the column housing is difficult to be realized. Consequently, for a conventional steering apparatus used in a vehicle of this kind, an energy absorbing mechanism is employed which absorbs energy of a secondary crash utilizing leaning of the steering shaft in a direction in which the tilt angle increases.

Figure 1A:
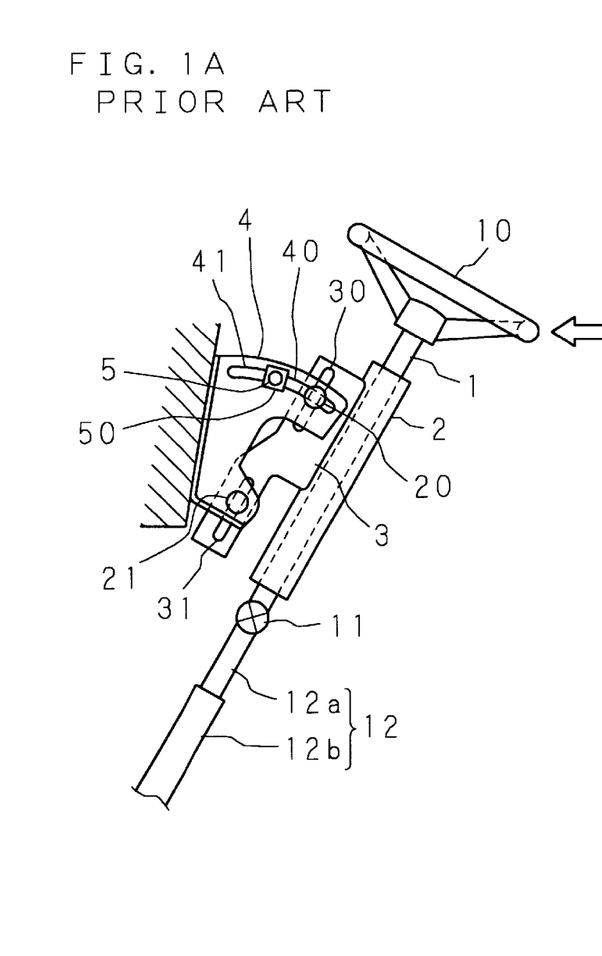
FIGS. 1A and 1B are schematic representations showing a constitution of a conventional steering apparatus comprising an energy absorbing mechanism utilizing an increase of a tilt angle.
Figure 1B:
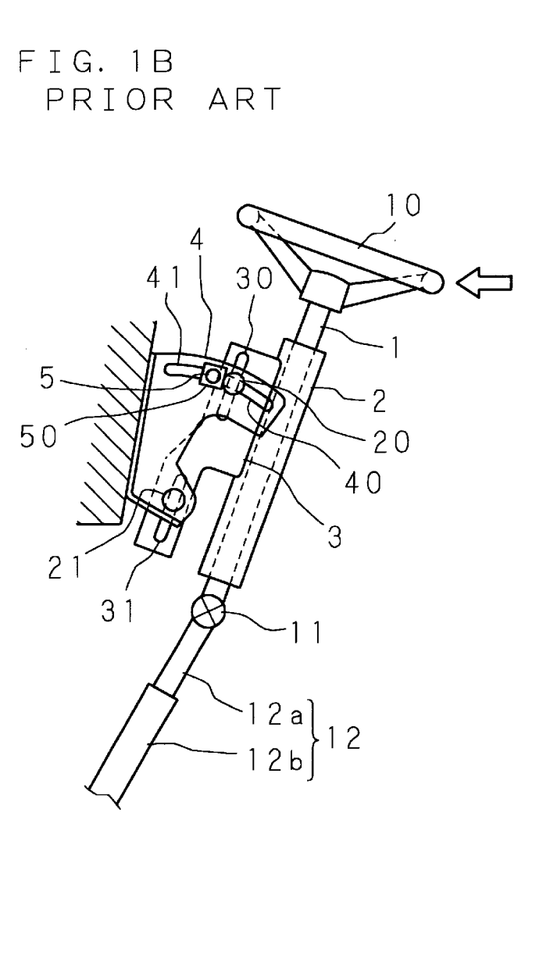

FIGS. 1A and 1B are schematic representations showing a constitution of a steering apparatus comprising an energy absorbing mechanism utilizing an increase of a tilt angle. A steering shaft 1 is rotatably supported in a cylindrical column housing 2, and is mounted to a tilting bracket 4, which is fixed to and supported by a part of a driver's room, via a column bracket 3 fastened to a middle portion of said column housing 2.

To an upper end portion of the steering shaft 1 which is projected from an upper portion of the column housing 2, a steering wheel 10 is fixed. A lower end portion of the steering shaft 1 which is projected from a lower portion of the column housing 2 is connected via a universal joint 11 and an intermediate shaft 12 to a steering mechanism which is not shown in the figures. Rotation caused by an operation of the steering wheel 10 for steering is transmitted to the steering mechanism via the steering shaft 1, the universal joint 11 and the intermediate shaft 12. The intermediate shaft 12, which is constructed by engaging an inner shaft 12a having a deformed cross section into an outer tube 12b of the same shape, is a telescopic shaft which can be extended and contracted in an axial direction by sliding the inner shaft 12a in and out of the outer tube 12b and can be rotated in one body at a suitable elastic position.

The column bracket 3 having a box-shaped cross section is integrally fastened to an exterior face of the column housing 2. The column housing 2 comprises a pair of upper and lower telescoping apertures 30 and 31 which extend in an axial direction of the column housing 2. The tilting bracket 4 has a cross section which is substantially in the shape of "U" with an open portion of both side walls placed downward. The column bracket 3, which is fitted between both side walls of the tilting bracket 4, is mounted with a locking bolt 20 and a guiding bolt 21 which respectively run through the telescoping apertures 30 and 31.

At a side wall of the tilting bracket 4 a tilting aperture 40 is formed which is curved in an arc shape with a through portion of the guiding bolt 21 at a lower position as a center of the arc. The locking bolt 20 at an upper position runs through an intersecting portion where a tilting aperture 40 and a telescoping aperture 30 intersects, and is fastened to said position. At an upper portion of the tilting aperture 40 a guiding aperture 41 is formed to have a curved form in an extension to the tilting aperture 40. At a boundary portion between the guiding aperture 41 and the tilting aperture 40 a stopper 5 is mounted. The stopper 5 which is configured as a tube with a diameter slightly larger than a width of the guiding aperture 41 is fitted at the boundary portion between the guiding aperture 41 and the tilting aperture 40 via a bush 50 made of resin, and is provided transversely between both side walls of the tilting bracket 4.

In a steering apparatus constituted as above, the above tilt adjustment and the telescopic adjustment are performed in a state where the locking bolt 20 is unfastened. The column bracket 3 can move with regard to the tilting bracket 4 fixed to a carbody by sliding the locking bolt 20 and the guiding bolt 21 along the upper and lower telescoping apertures 30 and 31. Telescopic adjustment for displacing the column housing 2 and the steering shaft 1 in an axial direction is caused by the movement of the column bracket 3. This adjustment is achieved by extension and contraction of the intermediate shaft 12 constituted as a telescopic shaft.

Moreover, the column bracket 3 can be oscillated about an axis of the guiding bolt 21 with regard to the tilting bracket 4 fixed to a carbody, by sliding the locking bolt 20 along the tilting aperture 40. Tilt adjustment for adjusting a tilt angle of the column housing 2 and the steering shaft 1 is achieved by the oscillation of the column bracket 3. The steering shaft 1 and the column housing 2 thus can be oscillated about an axis of a connecting portion of the steering shaft 1 and the universal joint 11, and extension and contraction of the intermediate shaft 12 change the tilted orientation.

FIG. 1A shows a state of a steering apparatus having a medium tilt angle, and FIG. 1B shows a state of a steering apparatus having a largest tilt angle. The tilt adjustment is achieved within the limits of an angle from a lower end of the tilting aperture 40 to a position where the stopper 5 is provided.

After performing telescopic adjustment and tilt adjustment as described above, the locking bolt 20 is fastened. By fastening the locking bolt 20, the column bracket 3 is supported between both side walls of the tilting bracket 4. In a state where the steering shaft 1 and the column housing 2 are thus fixed so as to be unmovable, steering is achieved by operating the steering wheel 10 mounted to an upper end of the steering shaft 1.

When a vehicle makes a crash during a steering operation and a driver makes a secondary crash against the steering wheel 10 at an upper end of the steering shaft 1 by the action of inertia caused by the crash, the column housing 2 and the steering shaft 1 are pushed in a direction in which a tilt angle increases, by the action of force applied in a direction which is indicated with the arrows relieved in white in FIGS. 1A and 1B. The column bracket 3 to which the force is applied moves along the tilting aperture 40 until the column bracket 3 crashes into the stopper 5. The stopper 5 into which the column bracket 3 crashes slides into the guiding aperture 41 arranged in an extension to the tilting aperture 40 with searing and destroying the bush 50 made of resin, and keeps sliding with deformation of the stopper 5 until the stopper 5 comes to an end portion.

In the above operation, energy of the secondary crash is successively absorbed by sliding resistance between the column bracket 3 and the tilting bracket 4 caused by movement of the column bracket 3 which is fixed with the locking bolt 20, by energy used for shearing and destroying the bush 50, and by sliding resistance between the guiding aperture 41 and the stopper 5. As a result, action force which is applied to the driver who crashes into the steering wheel 10 is weakened, and driver's damage can be reduced.

Figure 2A:
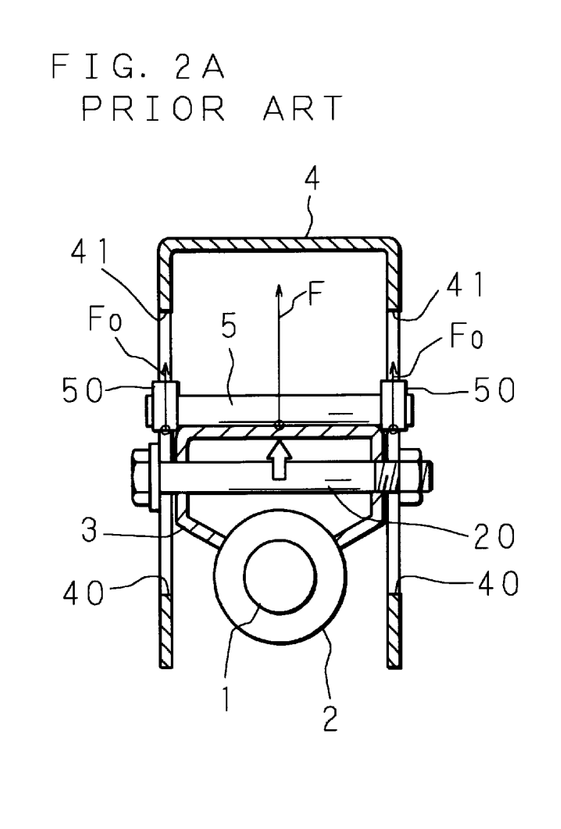
FIGS. 2A and 2B are representations illustrating a state of a crash between a column bracket and a stopper in the steering apparatus shown in FIGS. 1A and 1B.
Figure 2B:
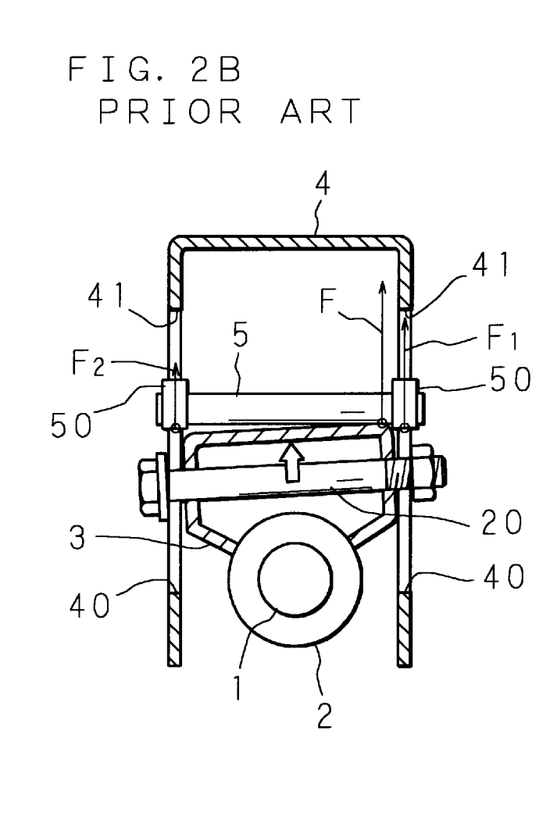

However, in a conventional steering apparatus constituted as above, the above-mentioned absorbability of secondary crash energy is influenced by a state of a crash of the column bracket 3 and the stopper 5. Consequently, there arises a problem that damage can not be reduced as preferably as expected when the column bracket 3 and the stopper 5 crash in an improper manner. FIGS. 2A and 2B show representations for illustrating a state of a crash of the column bracket 3 and the stopper 5, showing a cross section along a direction in which the tilting aperture 40 and the guiding aperture 41 are extended.

The column bracket 3 is configured as a member with a box-shaped cross section, supported between both side walls of the tilting bracket 4 having a cross section which is substantially in the shape of "U". A flat upper face of the column bracket 3 faces the stopper 5 which is provided transversely between the both side walls. When a driver makes a secondary crash against the steering wheel, the column bracket 3 moves in a direction which is indicated with the arrows relieved in white in FIGS. 2A and 2B until the column bracket 3 crashes into the stopper 5. FIG. 2A shows a normal state of a crash and FIG. 2B shows an abnormal state of a crash.

As shown in FIG. 2A, when a whole upper face of the column bracket 3 crashes into the stopper 5 in a substantially even manner with regard to the total length of the stopper 5, force components $F_0$ and $F_0$ ($F_0 \cong F/2$) with substantially half magnitude of an impact force F applied to a whole crashed portion of the column bracket 3 are respectively applied to bushes 50, 50 which support both sides of the stopper 5. As a result, the bushes 50, 50 on both sides of the stopper 5 are destroyed substantially simultaneously. The stopper 5 slides into the guiding apertures 41, 41 on both sides of the tilting bracket 4, and sliding resistance is generated between the stopper 5 and the guiding apertures 41, 41. Required energy absorption is thus achieved in a normal state of a crash.

On the other hand, for example, when the column bracket 3 moves in a state where the bracket 3 is tilted between the side walls of the tilting bracket 4 before crashing into the stopper 5 and a part of the column bracket 3 crashes into the stopper 5 locally as shown in FIG. 2B, the impact force F is concentrated on this crashed portion. To a bush 50 at a position nearer to the crashed position, which is one of bushes 50, 50 on both sides of the stopper 5, a large force component $F_1$ is applied, while to a bush 50 at a position farther from the crashed position, which is the other of the bushes 50, 50, a small force component $F_2$ is applied. After the former bush 50 is destroyed, the stopper 5 slides into the guiding apertures 41, 41 in a state where the stopper 5 is tilted with a destroyed side thereof placed ahead.

The column bracket 3 which has slid into the guiding apertures 41, 41 comes to a sliding end without enough amount of energy of the secondary crash being absorbed, since a guiding aperture 41 on one side is under small sliding resistance. Consequently, it may occur that a large impact force is applied to the driver when the column bracket 3 comes to the sliding end. Moreover, when the stopper 5 is tilted on a large scale, the stopper 5 is hindered from sliding after sliding into the guiding aperture 41. In such a case, it is possible that energy is not absorbed during a slide of the stopper 5 and a large impact force is applied to the driver.

In a conventional steering apparatus, as mentioned above, it is required that a normal state of a crash as shown in FIG. 2A is always realized, for gaining required absorbability of secondary crash energy. To realize a normal state of a crash, high accuracy is demanded in shaping related parts such as the tilting bracket 4 including the tilting apertures 40 and the guiding apertures 41, the column bracket 3, the stopper 5 and the like. As a result, there arises a problem in that production costs of the steering apparatus increase.

BRIEF SUMMARY OF THE INVENTION

The present invention has been made with the aim of solving the above problems, and an object of the invention is to provide a steering apparatus, with which energy of a secondary crash can always be absorbed under a proper condition utilizing leaning of the steering shaft in a direction in which a tilt angle increases, while high accuracy is not demanded in shaping related parts.

In a steering apparatus according to the present invention, a column bracket provided at the middle of a cylindrical column housing for supporting the steering shaft so as to be rotatable is supported between both side walls of a tilting bracket fixed to a part of a vehicle, so as to be displaceable along tilting apertures which are formed respectively at the side walls of the tilting bracket. Consequently, a tilt angle of the steering shaft can be adjusted. Moreover, the steering apparatus comprises guiding apertures arranged in an extension to the tilting apertures beyond an adjustable region of a tilt angle, and a stopper which is provided transversely between the side walls at boundary portions between the tilting apertures and the guiding apertures. The stopper, which is pressured by the column bracket by the action of energy of a secondary crash applied to the steering shaft at the time of a crash of the vehicle, slides along the guiding apertures. Furthermore, the steering apparatus comprises a contact projection or contact projections provided on the stopper and/or on the column bracket in such a manner that a projection on one member is projected toward the other member from a substantially center portion between both side walls of the tilting bracket.

When the column bracket slides between side walls of the tilting bracket at the time of occurrence of the secondary crash and crashes into the stopper in a state where the tilt angle comes to a limitation of adjustment, the crash occurs at the contact projection provided at a center portion in a width direction of the stopper and/or the column bracket. Action force generated at this crashed portion is applied to both end portions of the stopper which are supported on the both side walls of the tilting bracket, as substantially equal force components. Consequently, the stopper slides along the guiding apertures arranged in an extension to the tilting apertures under an even condition for each of the guiding apertures on both sides, and thus energy of the secondary crash can be reliably absorbed. In the steering apparatus according to the present invention, high accuracy is not demanded in shaping related parts.

Moreover, the steering apparatus according to the present invention is constructed in such a manner that each side of the stopper is supported at a boundary portion between the tilting aperture and the guiding aperture via a supporting bush made of resin. Consequently, a slide of the stopper along the guiding apertures with the crash of the column bracket is achieved in a stable manner via the supporting bushes made of resin, and energy of the secondary crash can be absorbed further reliably.

Furthermore, in the steering apparatus according to the present invention, the boundary portion between the tilting aperture and the guiding aperture, where the stopper is mounted, is formed to have a greater width than other portions. Since the supporting bushes on both sides of the stopper are accommodated in the boundary portions formed to have a greater width than other portions, the stopper can avoid being moved by a slight crash of the column bracket during tilt adjustment. Moreover, energy of the secondary crash can be reliably absorbed.

The above and further objects and features of the invention will more fully be apparent from the following detailed description with accompanying drawings.

DETAILED DESCRIPTION OF THE INVENTION

Figure 3:
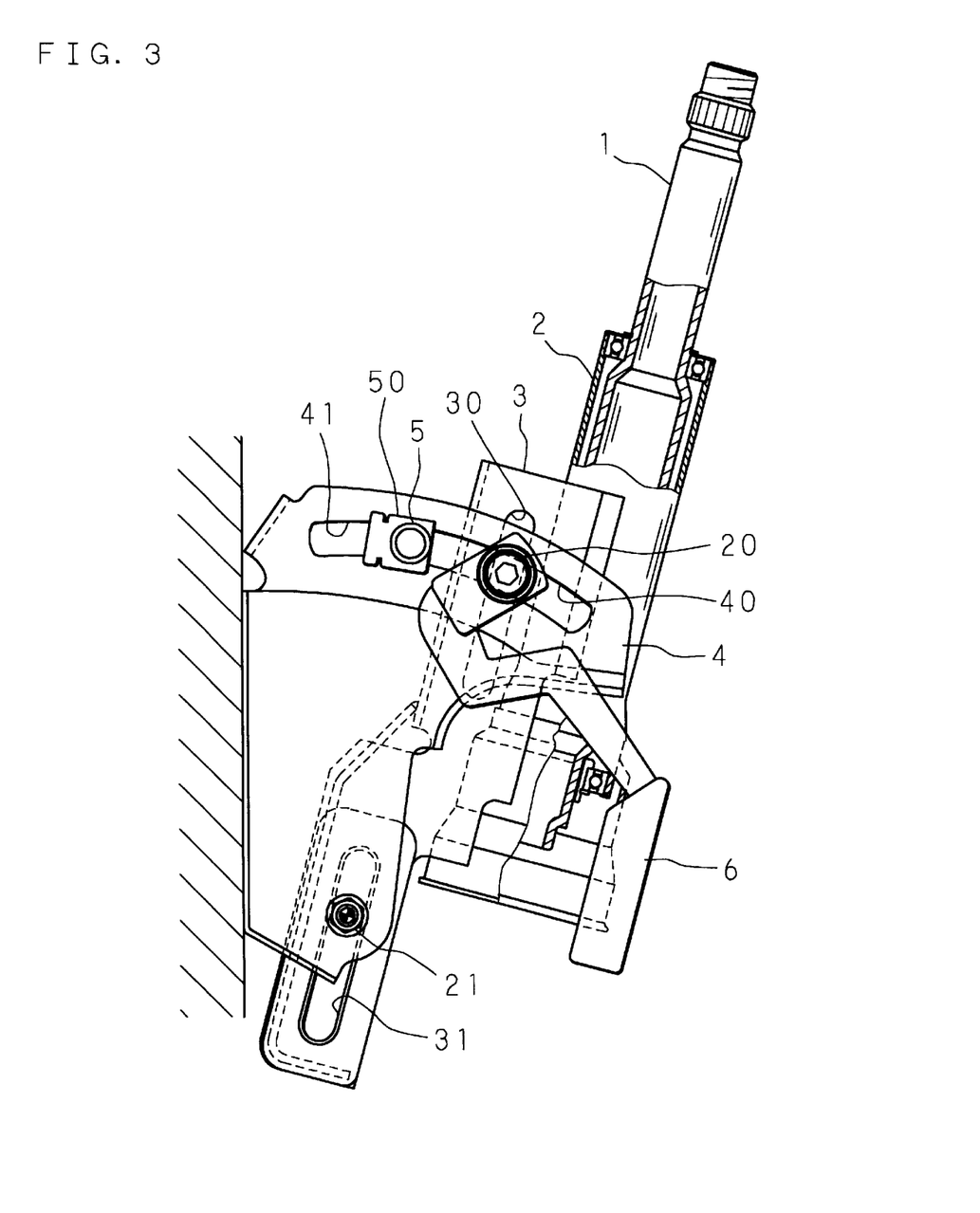
FIG. 3 is a partially sectional side view showing a constitution of a main part of a steering apparatus according to the present invention.

The following description will explain the present invention in detail with reference to the drawings illustrating some embodiments thereof. FIG. 3 is a partially sectional side view showing a constitution of a main part of a steering apparatus according to the present invention.

A steering shaft 1 is supported in a cylindrical column housing 2 so as to be rotatable about an axis. The steering shaft 1 and the column housing 2 are mounted to a tilting bracket 4, which is fixed to and supported by a part of a driver's room, via a column bracket 3 which is fastened at an exterior side of a middle portion of the column housing 2.

At an upper end portion of the steering shaft 1 projected from an upper portion of the column housing 2, a steering wheel which is not shown in the figure is fixed in the same manner as the conventional steering apparatus shown in FIGS. 1A and 1B. A lower end portion of the steering shaft 1 projected from a lower portion of the column housing 2 is connected to a steering mechanism which is not shown in the figure. Rotation caused by an operation of the steering wheel for steering is transmitted via the steering shaft 1 to the steering mechanism.

Figure 4:
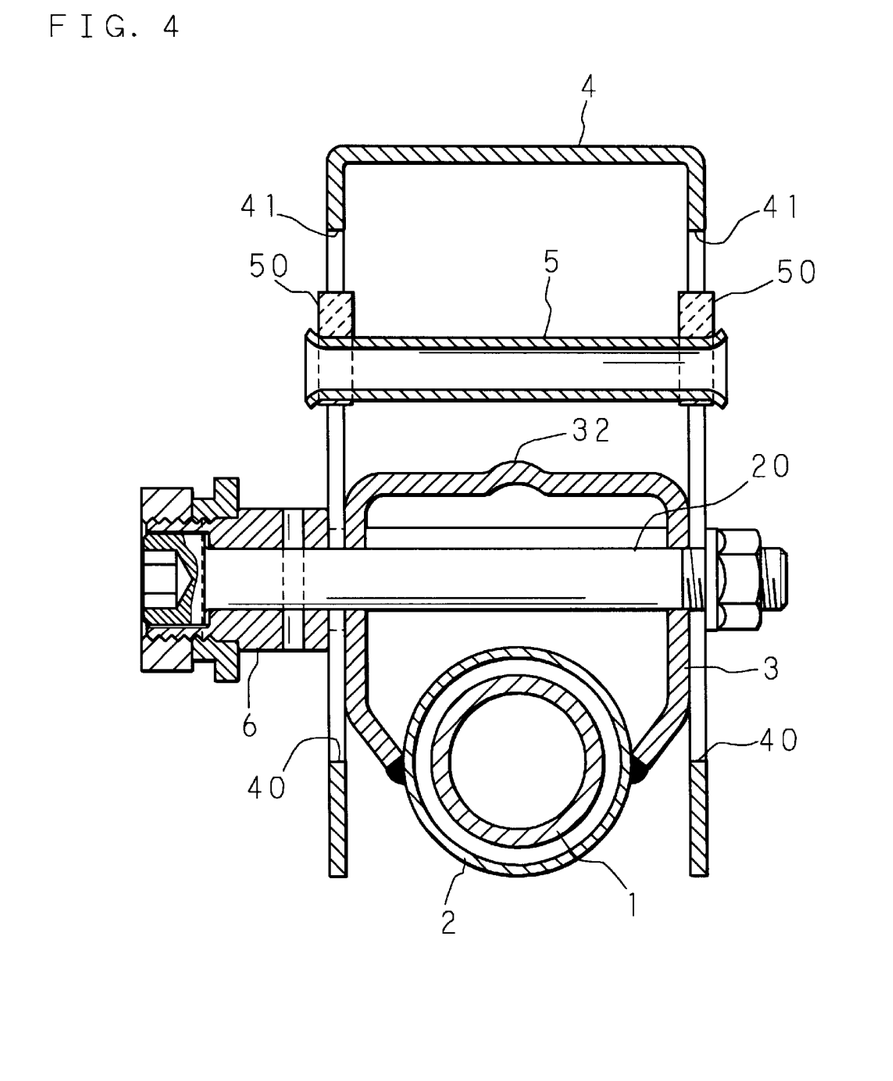
FIG. 4 is a transverse sectional view along a direction in which the tilting aperture of the steering apparatus shown in FIG. 3 is extended.

The column bracket 3 is mounted on the tilting bracket 4 with a locking bolt 20 and a guiding bolt 21 which are disposed separately from each other in a longitudinal direction of the column housing 2. As shown in FIG. 4, the tilting bracket 4 having a cross section which is substantially in the shape of "U" is fixed to a part of a vehicle, with an open portion between side walls on both of right and left sides placed downward. The column bracket 3 having a box-shaped cross section is integrally fastened at an exterior face of the column housing 2. Said column bracket 3 is fitted between both side walls of the tilting bracket 4, with a fastened side of the column housing 2 placed on a lower side.

As shown in FIG. 3, a side face of the column bracket 3 is provided with a pair of upper and lower telescoping apertures 30 and 31 extended in an axial direction of the column housing 2. The guiding bolt 21 penetrates both side walls of the tilting bracket 4 and runs through one telescoping aperture 31, which is at a lower position, so as to be movable along the telescoping aperture 31. At both side walls of the tilting bracket 4 tilting apertures 40, 40 which are curved in an arc shape with a through portion of the guiding bolt 21 as a center of the arc are formed to intersect telescoping apertures 30, 30 of the column bracket 3. The locking bolt 20 runs through intersecting portions of the tilting apertures 40, 40 and the telescoping apertures 30, 30, and is fastened at side walls of the tilting bracket 4.

To one end of the locking bolt 20 a base of a tilting lever 6 is fixed, the tilting lever 6 being extended downward along the column housing 2. Fastening and unfastening of the locking bolt 20 can be easily achieved by operating the tilting lever 6 manually.

FIG. 4 is a transverse sectional view along a direction in which the tilting apertures 40, 40 are extended. As shown in FIGS. 3 and 4, guiding apertures 41, 41 are formed at one end (an upper end) of the tilting apertures 40, 40 to have a curved form in an extension to the tilting apertures 40, 40. The stopper 5 is mounted in such a manner that the stopper 5 is provided transversely between boundary portions between the tilting apertures 40, 40 and the guiding apertures 41, 41.

The stopper 5 is configured as a tube with a diameter slightly larger than a width of the guiding aperture 41. Bushes 50, 50 made of resin in a rectangular external form are engaged with the stopper 5 by fixing the bushes 50, 50 to the proximity of both end portions of said stopper 5. A boundary portion between the tilting aperture 40 and the guiding aperture 41, where the stopper 5 is mounted, is formed to have a greater width than other portions. Each of the bushes 50, 50 is fitted at a boundary portion on a corresponding side. The stopper 5 is provided transversely between both side walls of the tilting bracket 4 in such a manner that the stopper 5 faces an upper face of the column bracket 3.

In the present invention, a bump-shaped contact projection 32 is provided at a substantially center portion between both side walls of the tilting bracket 4 on an upper face of the column bracket 3 facing the stopper 5 provided transversely as above.

In the steering apparatus constituted as above, the tilt adjustment and the telescopic adjustment are achieved in a state where the locking bolt 20 is unfastened by operating the tilting lever 6 for releasing support of the column bracket by right and left side walls of the tilting bracket 4.

When the locking bolt 20 is unfastened, the column bracket 3 can move in an axial direction of the steering shaft 1 and the column housing 2 with regard to the tilting bracket 4 fixed to a carbody, with a slide of the locking bolt 20 in the upper telescoping aperture 30 and a slide of the guiding bolt 21 in the lower telescoping power 31. Telescopic adjustment is thus achieved in such a manner that an upper end position of the steering shaft 1, to which the steering wheel is fixed, is moved up and down in an axial direction. Displacement of the steering shaft 1 and the column housing 2 in an axial direction during this tilt adjustment is achieved by extending and contracting the intermediate shaft 12 (see FIGS. 1A and 1B) connected to a lower end of the steering shaft 1.

Moreover, after support of the column bracket 3 by the tilting bracket 4 is released, the column bracket 3 can oscillate about an axis of the guiding bolt 21 with regard to the tilting in bracket 4 fixed to a carbody, with a slide of the locking volt 20 along the tilting aperture 40. With this oscillation, tilt adjustment for adjusting a tilt angle of the steering shaft 1 and the column housing 2 is achieved.

A tilted orientation of the steering shaft 1 and the column housing 2 can be changed within the limits of an angle ranging from a position where the locking bolt 20 comes to a lower end of the tilting aperture 40 to a position where an upper face of the column bracket 3 comes to the stopper 5. As shown in FIGS. 1A and 1B, the tilted orientation is changed with the oscillation about an axis of a connecting portion of a universal joint 11 at a lower end of said steering shaft 1 and with extension and contraction of the intermediate shaft 12.

After performing the above telescopic adjustment and tilt adjustment, the column bracket 3 is supported between both side walls of the tilting bracket 4, and the steering shaft 1 and the column housing 2 are fixed with the locking bolt 20 fastened by operating the tilting lever 6. The steering wheel 10 mounted at an upper end of said steering shaft 1 can be operated for steering in such a condition.

As described above, when a vehicle makes a crash during a steering operation in a state where the steering shaft 1 is fixed and a driver makes a secondary crash against the steering wheel 10 at an upper end of the steering shaft 1 by the action of inertia caused by this crash, the column bracket 3 fixed with the locking bolt 20 moves along the tilting apertures 40, 40 on both sides of the tilting bracket 4 until the column bracket 3 crashes into the stopper 5 in the same manner as a conventional steering apparatus. With the movement of the column bracket 3, the column housing 2 and the steering shaft 1 lean in a direction in which a tilt angle increases. As a next step, the stopper 5, pushed by the column bracket 3 at the time of the crash, slides into the guiding apertures 41, 41 arranged in an extension to the tilting apertures 40, 40 with shearing and destroying bushes 50, 50 on corresponding sides, and keeps sliding with deformation of the stopper 5 until the stopper 5 comes to an end portion.

In the above operation, energy of the second crash can be successively absorbed by sliding resistance between the column bracket 3 and the tilting bracket 4 fixed to the column bracket with the locking bolt 20, by energy used for shearing and destroying bushes 50, 50 on both sides of the stopper 5, and by sliding resistance between the guiding apertures 41, 41 and the stopper 5. Consequently, action force applied to a driver who crashes into the steering wheel 10 is weakened and driver's damage can be reduced.

Furthermore, with the steering apparatus according to the present invention, destroying the bushes 50, 50 on both sides of the stopper 5 at the time of a crash of the column bracket 3 and the following slide of the stopper 5 along the guiding apertures 41, 41 can be achieved in a stable manner by under-mentioned action of a contact projection 32 provided at the column bracket 3. Energy of the secondary crash can reliably be absorbed.

Figure 5:
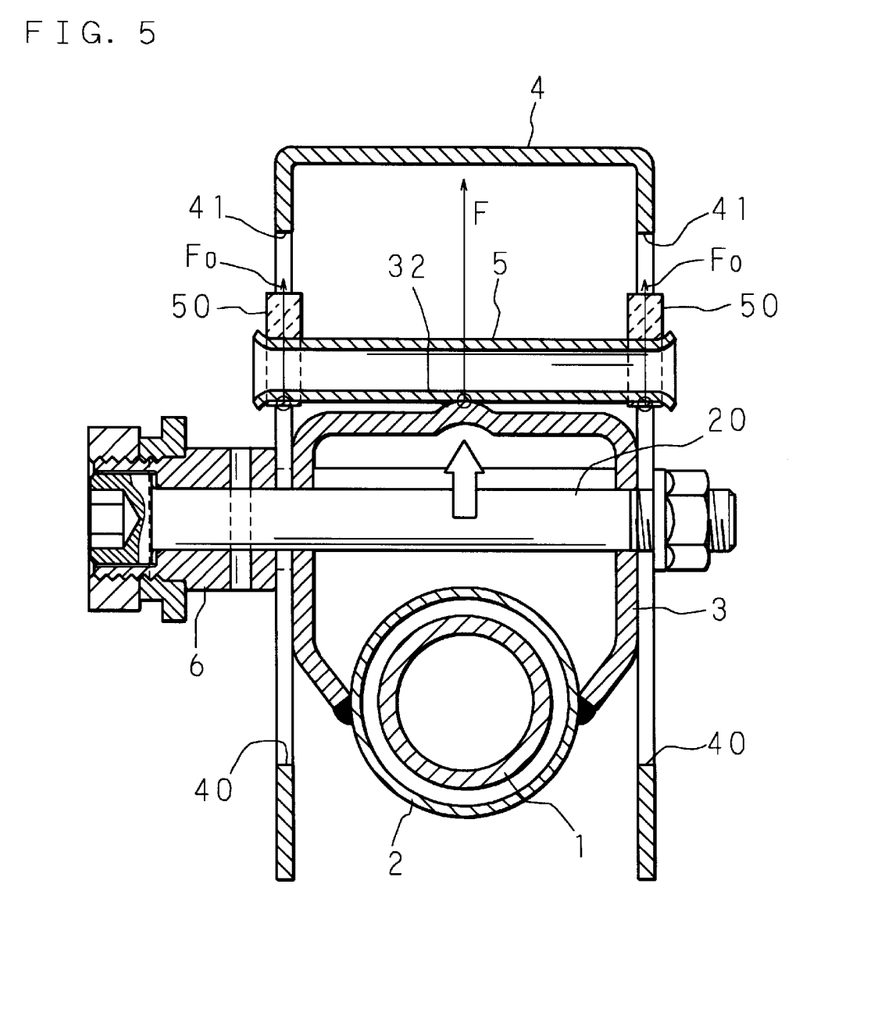
FIG. 5 is a representation for illustrating a state of a crash between a column bracket and a stopper in the steering apparatus shown in FIGS. 3 and 4.

FIG. 5 is a representation for illustrating a state of a crash between the column bracket 3 and the stopper 5, showing a transverse sectional view common with FIG. 4. When a secondary crash occurs in a state in which the steering shaft is fixed as shown in FIG. 4, the column bracket 3 moves toward the stopper 5 as indicated with the arrow relieved in white in FIG. 5 until the column bracket 3 crashes into the stopper 5. Since the steering apparatus according to the present invention is provided with the contact projection 32 at a substantially center portion of the column bracket 3, the crash occurs at a position where this contact projection 32 is projected. An impact force F acts concentrically on a position of the stopper 5 which corresponds to the contact projection 32, i.e. on a substantially center portion of both side walls of the tilting bracket 4.

On each of the bushes 50, 50 made of resin for supporting both ends of the stopper 5, a force component $F_0$ ($F_0 \approx F/2$) with a substantially half magnitude of the impact force F is applied. The bushes 50, 50 are sheared and destroyed substantially simultaneously and the stopper 5 slides into the guiding apertures 41, 41 on both sides of the tilting bracket 4. Sliding resistance between the stopper 5 and the guiding apertures 41, 41 is applied to both sides of the stopper 5 in an even manner.

In this constitution, a crash of the contact projection 32 into a center portion of the stopper 5 occurs irrespective of an orientation of the column bracket 3 before the crash. There is no fear that the stopper 5 makes a lopsided crash, inclined to one side of the stopper 5 as shown in FIG. 2B.

Consequently, the stopper 5 slides under sliding resistance between the stopper 5 and the guiding apertures 41, 41 on both sides of the tilting bracket 4 after the crash, and expected energy absorbability can be reliably obtained. An impact applied to a driver who crashes into the steering wheel is weakened and damage done by this impact can be reduced preferably. Moreover, in the present invention, high accuracy is not demanded in shaping related parts such as the tilting bracket 4 including the tilting apertures 40 and the guiding apertures 41, the column bracket 3, the stopper 5 and the like.

Figure 6:
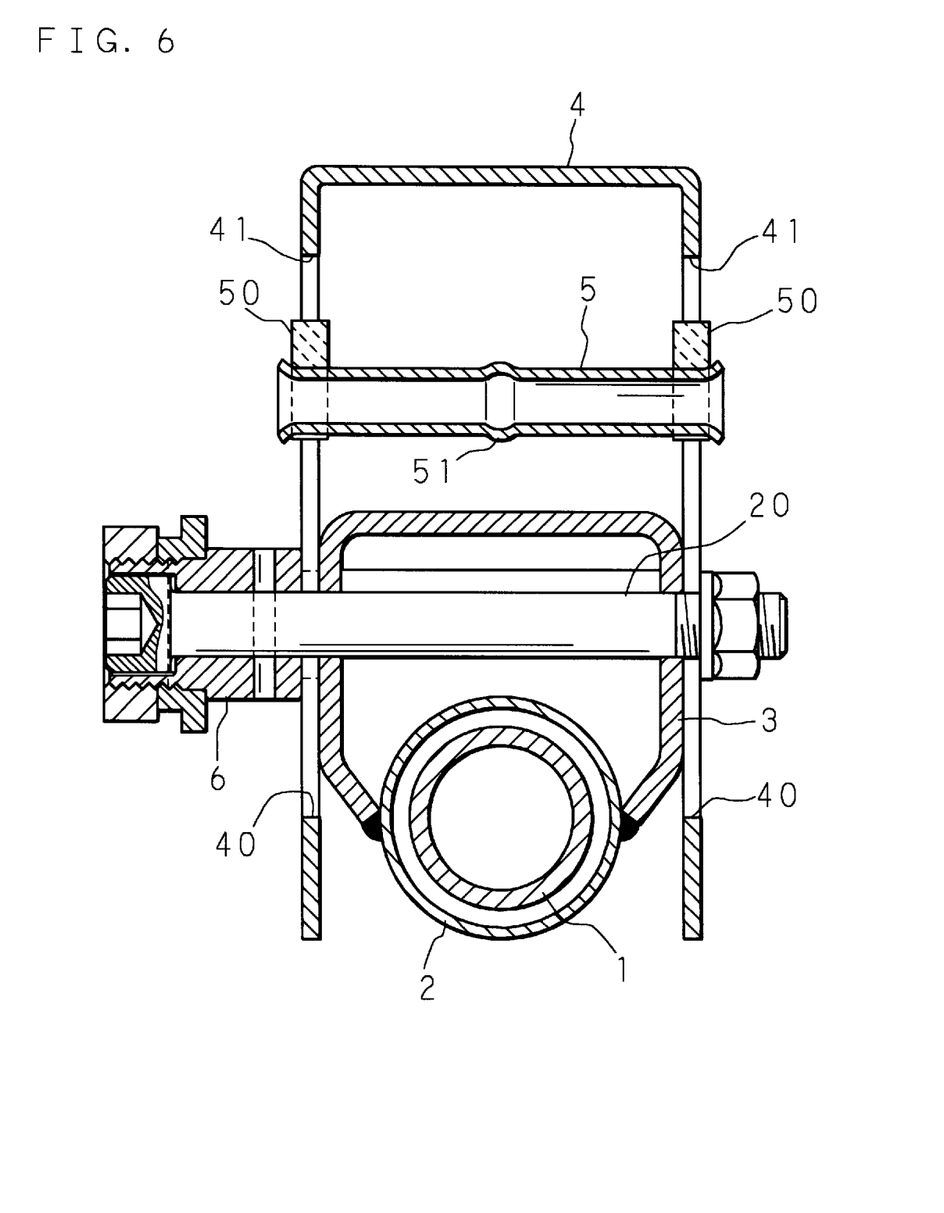
FIG. 6 is a transverse sectional view showing another embodiment of the steering apparatus according to the present invention.
Figure 7:
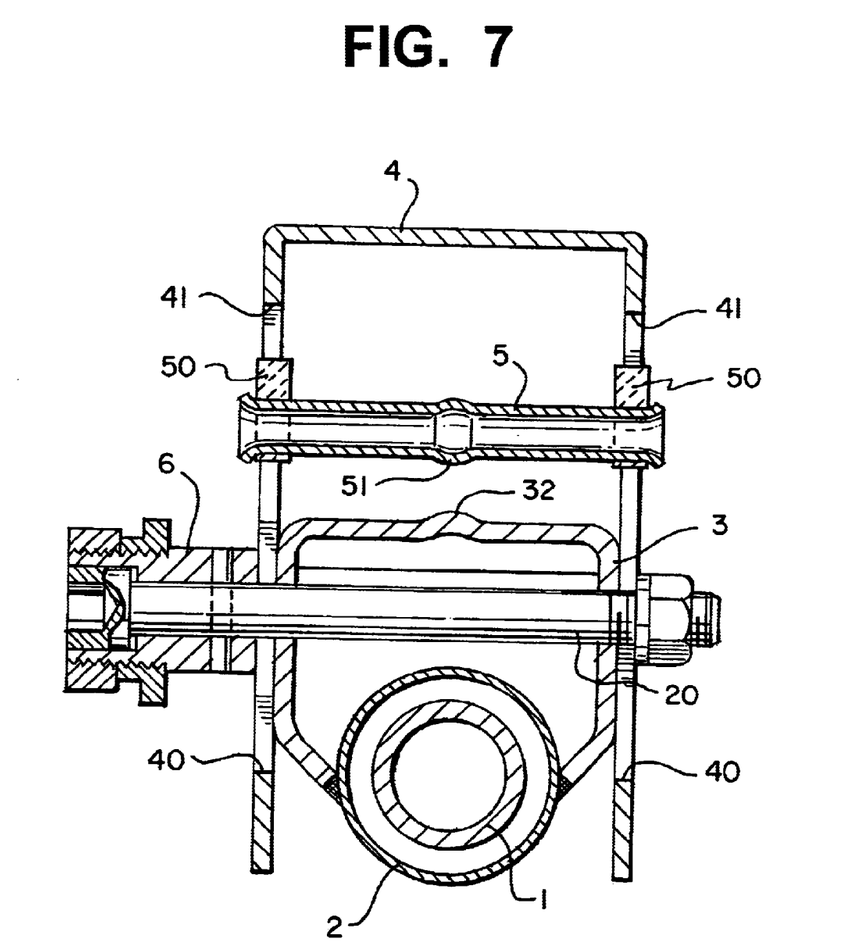
FIG. 7 is a transverse sectional view showing a further embodiment of the steering apparatus according to the present invention including both contact projections 32 and 51.

FIG. 6 is a transverse sectional view showing another embodiment of the steering apparatus according to the present invention. At a middle portion of the stopper 5 which is provided transversely between both side walls of the tilting bracket 4 and faces an upper face of the column bracket 3, a contact projection 51 is formed by increasing the diameter of the stopper 5 at a position corresponding to a substantially center portion of the side walls in the shape of a ring.

In this embodiment, the crash between the stopper 5 and the column bracket 3 which moves with the secondary crash also occurs at a position where the contact projection 51 is formed, i.e. a portion corresponding to a substantially center portion of side walls of the tilting bracket 4. As a result, the stopper 5 reliably slides into the guiding apertures 41, 41 on both sides of the tilting bracket 4, and sliding resistance between the stopper 5 and the guiding apertures 41, 41 is applied to both sides of the stopper 5 in an even manner. Consequently, required energy absorbability is obtained, an impact applied to the driver is weakened, and damage done by the impact can be preferably reduced.

Furthermore, both of the contact projection 32 at the column bracket 3 which is shown in FIG. 4 and the contact projection 51 at the stopper 5 which is shown in FIG. 6 may be formed to realize a crash between the projections 32 and 51 at the time of occurrence of the secondary crash.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A steering apparatus, comprising:
   a steering shaft;
   a cylindrical column housing for supporting said steering shaft so as to be rotatable;
   a column bracket provided on said column housing;
   a tilting bracket fixed to a part of a vehicle and having side walls;
   tilting apertures which are respectively formed at the side walls of said tilting bracket;
   guiding apertures which are arranged in an extension to the tilting apertures;
   a stopper provided transversely between the side walls at boundary portions between the tilting apertures and the guiding apertures; and
   a contact projection which is projected toward the stopper from the column bracket at a position corresponding to a substantially center portion between both side walls of the tilting bracket;
   wherein the column bracket is supported between both side walls of the tilting bracket so as to be displaceable along the tilting apertures for adjusting a tilt angle of the steering shaft, and
   the stopper, which is pressured by the column bracket by the action of energy of a secondary crash applied to the steering shaft at the time of a crash of the vehicle, slides along the guiding apertures.

2. The steering apparatus according to claim 1, wherein the stopper is supported at the boundary portions between the tilting apertures and the guiding apertures via supporting bushes made of resin.

3. The steering apparatus according to claim 2, wherein the boundary portions between the tilting apertures and the guiding apertures are formed to have a greater width than other portions of the tilting apertures and guiding apertures other than the boundary portions.

4. The steering apparatus according to claim 1, further comprising a contact projection which is projected toward the column bracket from the stopper at a position corresponding to a substantially center portion between the side walls of the tilting bracket.

5. The steering apparatus according to claim 4, wherein the stopper is supported at the boundary portions between the tilting apertures and the guiding apertures via supporting bushes made of resin.

6. The steering apparatus according to claim 5, wherein the boundary portions between the tilting apertures and the guiding apertures are formed to have a greater width than portions of the tilting apertures and guiding apertures other than the boundary portions.

7. A steering apparatus, comprising:
   a steering shaft;
   a cylindrical column housing for supporting said steering shaft so as to be rotatable;
   a column bracket provided in the middle of said column housing;
   a tilting bracket fixed to a part of a vehicle and having side walls;
   tilting apertures which are respectively formed at bath-the side walls of said tilting bracket;
   guiding apertures which are arranged in an extension to the tilting apertures;
   a stopper provided transversely between the side walls at boundary portions between the tilting apertures and the guiding apertures; and
   a contact projection which is projected toward the column bracket from the stopper at a position corresponding to a substantially center portion between both side walls of the tilting bracket,
   wherein the column bracket is supported between both side walls of the tilting bracket so as to be displaceable along the tilting apertures for adjusting a tilt angle of the steering shaft, and
   the stopper, which is pressured by the column bracket by the action of energy of a secondary crash applied to the steering shaft at the time of a crash of the vehicle, slides along the guiding apertures.

8. The steering apparatus according to claim 7, wherein the stopper is supported at the boundary portions between the tilting apertures and the guiding apertures via supporting bushes made of resin.

9. The steering apparatus according to claim 8, wherein the boundary portions between the tilting apertures and the guiding apertures are formed to have a greater width than portions of the tilting apertures and guiding apertures other than the boundary portions.

* * * * *